United States Patent [19]
Kaminsky et al.

[11] 3,760,558
[45] Sept. 25, 1973

[54] APPARATUS FOR MANUFACTURING SACKS FROM A HOSE OF THERMALLY-JOINED MATERIAL

[76] Inventors: Igor Vasilievich Kaminsky, ulitsa Lenina, 51, kv. 12; Anatoly Mikhailovich Romanenko, ulitsa Parizhskoi Kommuny, 9a, kv. 7; Viktor Alexeevich Pimenov, ulitsa Donetskaya, 35, kv. 57; Grigory Fedorovich Markovsky, ulitsa Dontskaya, 52, kv. 53; Anatoly Afanasievich Sinichenko, ulitsa Gargarina, 54, kv. 24; Nikolai Ivanovich Levchenko, ulitsa Pervomaiskaya, 32, kv. 13, all of Severodonetsk, Voroshilovgradskoi Oblasti, U.S.S.R.

[22] Filed: Sept. 9, 1971

[21] Appl. No.: 179,046

[30] Foreign Application Priority Data
Jan. 4, 1971   U.S.S.R. ............................ 16 028 20

[52] U.S. Cl. ...................................... 53/183, 53/384

[51] Int. Cl. ............................................. B65b 9/12
[58] Field of Search ............................... 53/183, 384

[56] References Cited
UNITED STATES PATENTS

| | | | |
|---|---|---|---|
| 3,492,775 | 2/1970 | Rhine et al. ...................... | 53/183 X |
| 3,382,642 | 5/1968 | Shaw .................................. | 53/22 B |
| 3,360,901 | 1/1968 | Gallo .................................. | 53/384 X |
| 2,861,406 | 11/1958 | Holsman et al. ................... | 53/183 X |

*Primary Examiner*—Travis S. McGehee
*Attorney*—Holman & Stern

[57] ABSTRACT

A guide mandrel adapted for positioning and intermittently positively moving a tube, mounted on a common frame of the apparatus, is hollow and has a port on the side of a charging pipe telescopically connected with a means adapted for cutting through the tube wall, with such means being a movable continuation of the charging pipe and connecting the latter via the cut in the tube wall and the port with the hollow of the mandrel in the course of filling a sack.

2 Claims, 8 Drawing Figures

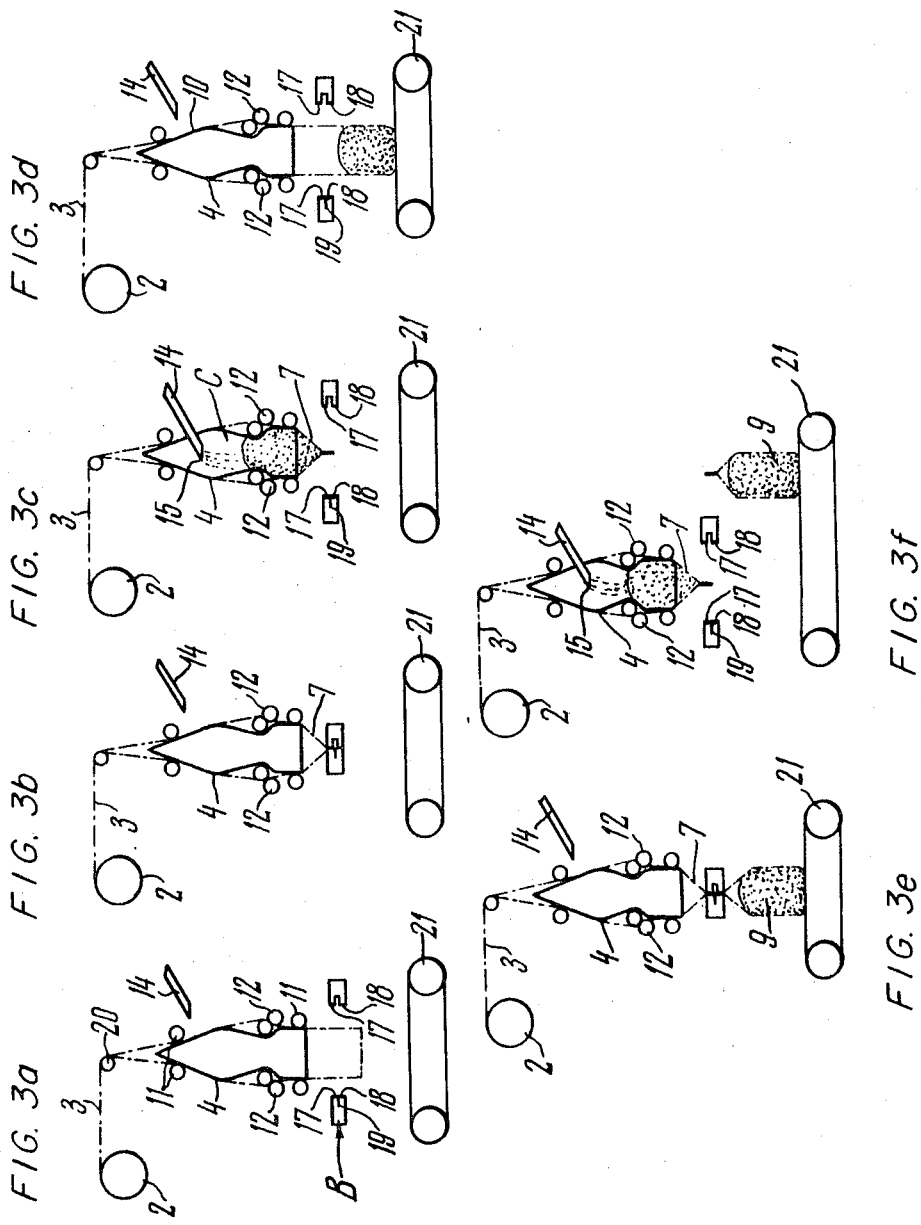

APPARATUS FOR MANUFACTURING SACKS FROM A HOSE OF THERMALLY-JOINED MATERIAL

BACKGROUND OF THE INVENTION

The present invention relates to apparatus for manufacturing articles from thermoplastic material and, more particularly, it relates to apparatus for manufacturing sacks from a tube of thermally joined material and weld-sealing the sacks after filling.

This invention can be most advantageously used for manufacturing sacks and sealing the sacks after filling thereof with loose, paste-like and powder-like products.

Prior Art

There are known apparatus designed for manufacturing sacks from a tube of thermally joined material and weld-sealing the sacks after filling, which comprise, mounted in technological succession on a common frame, a reel with a flat-folded tube periodically forced onto a guide mandrel, a means adapted for cutting through the tube wall, a feeder with a charging pipe adapted for filling the sack through the cut formed in the tube, and a device for welding and subsequent separation of the filled sack.

The guide mandrel according to the known apparatus is essentially a flat rod with two pairs of intermittently rotating rollers adapted to effect a positive displacement of a tube set thereon. The means adapted for cutting through the tube wall is essentially an electrical heater adapted to intermittently contact the tube wall and form a cut therein by melting the tube material. Likewise mounted on the common frame is a device adapted for mechanically opening the cut made in the tube wall and for imparting a cylindrical shape to the tube by blowing compressed air in the cut. The this end, the charging pipe is provided with a seal capable of reciprocating in a horizontal plane to open or close the charging pipe. The seal features a hook-shaped portion adapted for opening the cut in the tube when compressed air is supplied thereto and for keeping the tube open after the supply of compressed air is discontinued.

The presence of a separate device adapted for mechanically opening the cut in the tube and for imparting a cylindrical shape to the latter renders the overall structure of the apparatus more complicated and its manufacture more expensive. Positioning the device below the guide mandrel results in an increased height of the apparatus.

The known apparatus operate in the following manner:

The intermittently displaceable flat-folded tube is set on the guide mandrel rod. Then, cuts are formed in one of the tube walls by the electrical heater which contacts the tube intermittently (due to swinging motion).

As a result of the intermittent displacement of the tube and the synchronized swinging motion of the electrical heater, in the tube wall are formed longitudinally equidistant transverse cuts whose length is equal to approximately one half of the tube perimeter.

After that, thereafter the tube is welded in the lower portion thereof near the first cut but above the latter to form the bottom of a sack, and the strip with the first cut is separated from the tube. Then, the next cut of the tube is mechanically opened and the tube is imparted a cylindrical shape by mean of compressed air. Thereupon, the sack thus formed is filled with the product from the feeder via the charging pipe, after which the filled sack is lowered and there is effected the operation of welding the top of the latter sack and the bottom of the subsequent one, with a simultaneous separation of the filled sack.

Thereupon, the operating cycle is repeated.

In the known apparatus, after the sack has been filled, the charging pipe is removed from the cut and the tube is moved downwards. While so doing, the cut in the tube stays open. This may cause dusting of the environment, especially so, when filling the sack with a powder-like product. Therefore, the powder-like products for filling the sacks should be properly selected, that is, the properties of a product, for example, toxicity, should be taken into account. Moreover, in the course of filling the sack, impact loads of the product, in particular, in the case of force delivery, have an unfavorable effect upon the walls of the sack. This may affect the quality of sealing. The necessity of synchronizing the operation of all the units of the apparatus involves the use of complicated circuits of automatic control over the units, which results in the reduction of the overall reliability of the apparatus operation. All of this calls for increased adjustment, repair and maintenance costs.

It is an object of the present invention to eliminate the afore-listed disadvantages of the known apparatus.

Another important object of the invention is to provide an apparatus designed for manufacturing sacks from a tube of thermally joined material and for weld-sealing the sacks after filling, the apparatus featuring a guide mandrel and the position of a means adapted for cutting through the tube wall such as to provide for a simplicity of design as compared with the known apparatus of like designation.

Still another important object of the present invention is to provide an apparatus as defined above which is convenient in handling and reliable in operation.

In accordance with the foregoing and other objects, in an apparatus according to the present invention, the guide mandrel is hollow and has a port on the side of a charging pipe telescopically connected with the means adapted for cutting through the tube wall, such means being a movable continuation of the charging pipe and connecting the latter via the cut in the tube wall and the port with the hollow or interior of the mandrel in the course of filling the sack.

Such a structural solution renders the apparatus disclosed herein convenient in handling and reliable in operation.

Presented hereinbelow for a better understanding of the invention is a detailed description of a specific embodiment thereof, with due reference to the accompanying drawings, in which:

BRIEF DESCRIPTION OF THE DRAWINGS

FIGS. 3a–3b illustrate diagrammatically the sequence of technological steps in the course of the operation of the apparatus of the present invention.

DETAILED DESCRIPTION OF THE INVENTION

Figure 1:
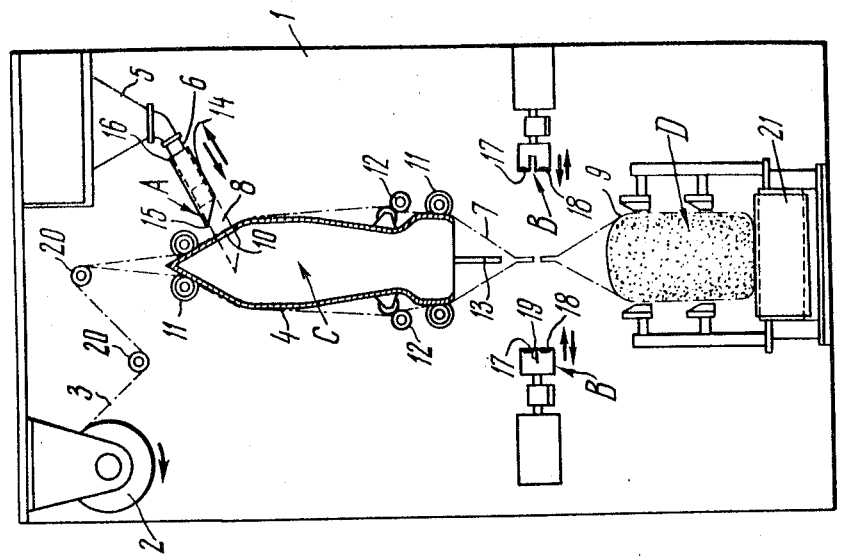
FIG. 1 is a diagrammatic perspective view of an apparatus dsigned for manufacturing sacks from a tube of thermally joined material and for weld-sealing the sacks after filling them, according to the present invention.

There is disclosed herein an apparatus designed for manufacturing sacks from a tube of thermally joined material and weld-sealing the sacks after filling. The apparatus comprises, mounted in technological succession on a common frame 1 (FIGS. 1, 2), a reel 2 with a flat-folded tube 3 intermittently forced onto a guide mandrel 4, a means A adapted for cutting through the wall of the tube 3, a feeder 5 provided with a charging pipe 6 (FIG. 2) adapted for filling a sack 7 through a cut 8 thus formed, and a device B for welding and subsequent separation of a sack 9 filled with product D.

In the specific embodiment described the sacks are filled with a loose product.

According to the present invention, the guide mandrel 4 (FIG. 2) is hollow and has a port 10 on the side of the charging pipe 6. The charging pipe 6 is telescopically connected with the means A which is a movable continuation of the charging pipe 6 and serves to connect the latter via the cut 8 in the wall of the tube 3 and the port 10 with hollow or interior space C of the mandrel 4 in the course of filling the sack 7.

The guide mandrel 4 is essentially a hollow vessel Which is open at its lower end for transferring the product from the hollow C to the sack 7. The mandrel has associated therewith two pairs of limiting rollers 11 to provide for a preset, in the given case, vertical position of the mandrel 4 in space, as well as drive rollers 12 to provide for intermittent positive displacement of the tube 3 set or positioned on the mandrel 4.

The mandrel is provided with resilient spacers 13 adapted to bring together the tube walls during welding.

The means A is essentially a nozzle 14 featuring, in the specific illustrated embodiment, a rectangular cross-section corresponding to the cross-section of the charging pipe 6. One end, 15, of the nozzle 14 is sharpened and serves to cut through the wall of the tube 3, while the other end, 16 is telescopically connected with the charging pipe 6. Any conventional device suitable for the purpose can be used as the device B for welding and the subsequent separation of the filled sack.

Figure 2:
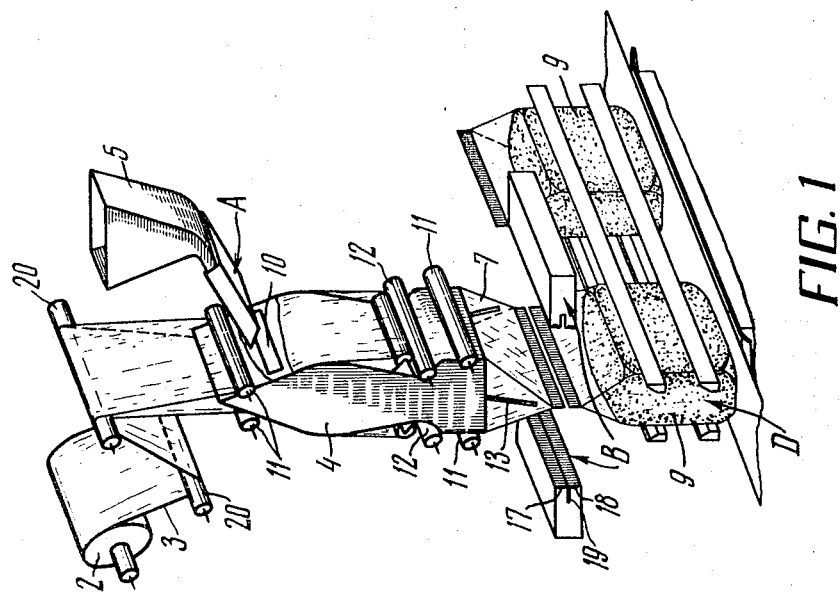
FIG. 2 is a diagrammatic view in a front elevation and partly in section taken along the guide mandrel.

In FIGS. 1 2, the device B is shown schematically as two pairs of welding members 17 and 18 for welding the bottom of the sack 7 and top of the sack 9, respectively, and a knife 19 for the separation of the sacks from each other.

The apparatus according to the present invention operates in the following manner:

FIGS. 3a – 3b illustrates the sequence of technological steps performed in the course of the apparatus operation.

The flat-folded tube 3 (FIGS. 1, 2) trained about rollers 20 is positioned on the guide mandrel 4 and passed, by means of the drive rollers 12, from the reel 2 to the level of the welding members 17 of the device B (FIG. 3a). Then, the lower portion of the tube 3 is welded by the welding members 17 to form the bottom of the sack 9 (FIG. 3b) thereafter, the device B is "moved apart," while a cut is made in the wall of the tube 3 by the sharpened end 15 of the nozzle 14 and the sharpened end 15 14 is introduced through the cut and the port 10 into the hollow C of the mandrel 4. Through the feeder 5 (FIGS. 1, 2), charging pipe 6, nozzle 14 and hollow C of the mandrel 4 the sack 9 is filled with product (FIG. 3c).

In the present apparatus, the sack is secured on the mandrel 4 in the course of being filled with the product. Impact loads of the product, especially, when it is force-fed, are taken up by the walls of the mandrel 4, thereby precluding the adverse effect of the impact loads upon the sack walls, which makes for an increased reliability of the apparatus operation.

Then, the nozzle 14 is withdrawn from the hollow C of the mandrel 4, and the tube is displaced by means of the drive rollers 12 downwards until the filled sack comes in contact with a removing conveyer 21 which is stationary at the moment (FIG. 3d). While so doing, the port 10 of the mandrel 4 is closed, immediately after the removal of the nozzle 14, by the wall of the tube 3 which is moved on the mandrel 4. This helps preclude dusting of the environment, especially, when filling sacks with powder-like products, and provides favorable operating conditions.

After that, then the device B is "brought together," and the welding members 17 act to weld the top of the sack 9 filled with the product, while the welding members 17 weld the bottom of the subsequent sack 7. Concurrently, the knife 19 operates to separate the filled sack 9 (FIG. 3e). Due to the synchronized operation of all the units, the cut 8 earlier made by the means A is positioned level with the knife 19. Further, the device B is "moved apart," and the conveyer 21 operates to displace the filled sack.

At the same time, the nozzle 14 forms by its sharpened end 15 a new cut in the wall of the tube 3, through which cut the subsequent sack 7 is similarly filled (FIG. 3f).

Thereupon, the operating cycle of the apparatus is repeated.

In the present apparatus, opening the tube and imparting the shape of a sack to the tube is effected by means of the hollow mandrel 4, while the cut 8 in the wall of the tube 3 is made by the sharpened end 15 of the nozzle 14 which thereafter enters the port 10 of the mandrel 4 and is a continuation of the charging pipe 6.

Such a structural solution helped obviate the need for a separate device for mechanically opening the cut in the tube wall and for imparting the shape of a sack to the tube. This resulted in a simpler design of the apparatus and its reduced height, thus bringing about more convenience in handling the apparatus and reliability of its operation.

What is claimed is:

1. An apparatus for manufacturing sacks from a flat tube of thermally joined material and for weld-sealing the sacks after filling, comprising a common frame; there being mounted in technological succession on the common frame: a reel provided with a flat tube; a rigid hollow guide mandrel adapted to accommodate the tube leaving said reel; a means for cutting through the wall of the tube accommodated on the mandrel; a feeder provided with a charging pipe adapted for filling with product a manufactured sack through the cut formed in the wall of the tube; a device for sealing said sack; said guide mandrel being provided with a closed, substantially wedge-shaped upper and, an open lower end, and a port in proximity to the closed upper end and being on the side thereof facing said charging pipe; said charging pipe being telescopically connected with said cutting means; said means being a movable continuation of said charging pipe and connecting the charging pipe via said cut in the tube wall and said port of the mandrel with the hollow of the mandrel in the course of filling the sack and drive rollers engaging the tube accommodated on the mandrel for intermittent positive displacement of the tube relative to the mandrel.

2. The apparatus as claimed in claim 1 including outer supporting rollers for the mandrel below said side port providing a preset position of the mandrel in space.

* * * * *